United States Patent [19]

Boroson et al.

[11] Patent Number: 5,599,766

[45] Date of Patent: Feb. 4, 1997

[54] METHOD OF MAKING A COLOR FILTER ARRAY ELEMENT

[75] Inventors: Michael L. Boroson; Cathy A. Fleischer, both of Rochester, N.Y.

[73] Assignee: Eastman Kodak Company, Rochester, N.Y.

[21] Appl. No.: 633,251

[22] Filed: Apr. 18, 1996

[51] Int. Cl.$^6$ .............................. B41M 5/035; B41M 5/38
[52] U.S. Cl. .......................... 503/227; 359/885; 428/195; 428/412; 428/913; 428/914; 430/200; 430/201
[58] Field of Search .................................. 8/471; 359/885; 428/195, 412, 913, 914; 430/200, 201; 503/227

[56] References Cited

U.S. PATENT DOCUMENTS 5,166,126  11/1992  Harrison et al. ........................ 503/227

*Primary Examiner*—B. Hamilton Hess
*Attorney, Agent, or Firm*—Harold E. Cole

[57] ABSTRACT

A method of preparing a color filter array element comprising the following steps:

a) imagewise-heating a dye-donor element comprising a support having thereon a dye layer comprising a dye dispersed in a binder, the dye layer being in superposed relationship with a dye image-receiving layer of a dye-receiving element comprising a support having thereon a dye image-receiving layer, the dye image-receiving layer comprising a polymer which has a glass transition temperature above the sublimation temperature of the dye but which contains an organic plasticizer in an amount so that the glass transition temperature of the dye image-receiving layer is below the sublimation temperature of the dye;

b) transferring portions of the dye layer to the dye-receiving layer to form a repeating dye pattern thereon to form a color filter array; and c) subjecting the dye-receiving element to a fusing heat treatment below the sublimation temperature of the dye but at a sufficient temperature and for a sufficient time so that the dye is not stratified on the surface.

8 Claims, No Drawings

METHOD OF MAKING A COLOR FILTER ARRAY ELEMENT

This invention relates to a method of making a color filter array element which is temperature-resistant and fade-resistant.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals, which are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been 'successful in meeting all the users' needs.

One commercially available type of color filter array element that has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Further details of this process are disclosed in U.S. Pat. No. 4,081,277.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, each pixel must be aligned with a color area, e.g., red, green or blue, of a color filter array. Depending upon the image to be displayed, one or more of the pixel electrodes is energized during display operation to allow full light, no light or partial light to be transmitted through the color filter area associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example, a transparent conducting layer, such as indium tin oxide (ITO), is usually vacuum sputtered onto the color filter array element which is then cured and patterned by etching. The curing may take place at temperatures as high as 200° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements, especially those with a gelatin matrix using the prior art technique described above.

In making stable color filter arrays of high resolution the transferred dye pattern must be fused into the receiver polymer layer, which is coated on a suitable support, to prevent subsequent dye smear, light fade, aggregation, crystallization, or heat loss problems with the transferred dyes. In addition, for the resulting color filter array to withstand subsequent high-temperature processing, the receiver polymer should have a high glass transition temperature (Tg) to prevent dye smear and dye loss under those more stringent post-processing conditions.

U.S. Patent No. 5,166,126 discloses the preparation of a color filter array element having a certain overcoat layer. During the manufacturing process, the transferred dye image is treated to stabilize the image, such as by radiant heating, solvent vapor or contact with heated rollers. There is a problem with solvent vapor fusing in that the use of solvents is harmful to the environment. The heat fusing treatments are not always effective to eliminate stratification of the dye at the surface. High-Tg receiver polymers of a dye-receiving layer require heat fusion temperatures higher than the sublimation temperatures of the dyes for sufficient penetration of the dyes into the polymeric receiver layers. However, the dye on the surface would tend to sublimate at that temperature rather than fuse into the polymer. If heat fusion takes place at a temperature below the Tg of the polymer, then little or no dye fusion occurs. Thus, heat fusion has generally been ineffective.

It is an object of this invention to provide a method for making a color filter array without using an environmentally-unfriendly solvent fusing technique but instead uses a heat fusing technique which is more effective than the prior art techniques and which would provide a color filter array having a high density.

These and other objects are obtained by this invention which relates to a method of preparing a color filter array element comprising the following steps:

a) imagewise-heating a dye-donor element comprising a support having thereon a dye layer comprising a dye dispersed in a binder, the dye layer being in superposed relationship with a dye image-receiving layer of a dye-receiving element comprising a support having thereon a dye image-receiving layer, the dye image-receiving layer comprising a polymer which has a glass transition temperature above the sublimation temperature of the dye but which contains an organic plasticizer in an amount so that the glass transition temperature of the dye image-receiving layer is below the sublimation temperature of the dye;

b) transferring portions of the dye layer to the dye-receiving layer to form a repeating dye pattern thereon to form a color filter array; and c) subjecting the dye-receiving element to a fusing heat treatment below the sublimation temperature of the dye but at a sufficient temperature and for a sufficient time so that the dye is not stratified on the surface.

After the fusing heat treatment, the color filter array may be heated again to remove any residual plasticizer remaining so that the dye image-receiving layer will be returned to a Tg sufficient to withstand the further processing conditions for preparing a color liquid crystal display device.

It has been found that addition of a plasticizer at a sufficient level will cause fusion of a transferred dye pattern to a desirable depth. The plasticizer lowers the Tg of the dye image-receiving layer and increases the rate of dye diffusing into it. When the plasticizer is subsequently removed, the Tg of the dye image-receiving layer is then returned approximately to the Tg of the dye image-receiving layer polymer itself to enable the dye pattern to be securely fixed.

Any plasticizer can be used in the polymeric dye image-receiving layer which is effective for the intended purpose. For example, the following plasticizers can be used:

ethyl benzoate catechol butyl benzoate dimethyl phthalate resorcinol sucrose diacetate hexaisobutyrate diethyl phthalate dibutyl phthalate dioctyl phthalate hexylresorcinol diphenyl phthalate dimethyl succinate diethyl succinate dibutyl succinate propyl benzoate dimethyl adipate diethyl adipate aminophenol chloromethylphenol butylbenzene dichlorobenzene tridecyloctyl ester chlorophenol hydroquinone creosol As noted above, the plasticizer is present in an amount so that the Tg of the dye image-receiving layer is below the sublimation temperature of the dye. In general, good results have been obtained when the plasticizer is present at a concentration of from about 5 to about 50 wt. % of the dye image-receiving layer.

Various methods may be used to transfer dye from the dye donor to the receiver in the process of the invention. There may be used, for example, a high intensity light flash technique with a dye-donor containing an energy absorptive material such as carbon black or a light-absorbing dye. Such a donor may be used in conjunction with a mirror which has a grid pattern formed by etching with a photoresist material. This method is described more fully in U.S. Pat. No. 4,923,860, the disclosure of which is hereby incorporated by reference.

Another method of transferring dye from the dye donor to the receiver in the process of the invention is to use a heated embossed roller as described more fully in U.S. Pat. No. 4,978,952, the disclosure of which is hereby incorporated by reference.

In another embodiment of the invention, the imagewise-heating is done by means of a laser using a dye-donor element comprising a support having thereon a dye layer and an absorbing material for the laser, the imagewise-heating being done in such a way as to produce a repeating mosaic pattern of colorants.

Any material that absorbs the laser energy or high intensity light flash described above may be used as the absorbing material such as carbon black or non-volatile infrared-absorbing dyes or pigments which are well known to those skilled in the art. In a preferred embodiment, cyanine infrared absorbing dyes are employed as described in U.S. Pat. No. 4,973,572, or other materials as described in the following U.S. Pat. Nos.: 4,948,777; 4,950,640; 4,950,639; 4,948,776; 4,948,778; 4,942,141; 4,952,552 and 4,912,083, the disclosures of which are hereby incorporated by reference. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. The infrared-absorbing material may be contained in the dye layer itself or in a separate layer associated therewith.

Diffusion of the transferred dye pattern deeper into the dye-receiving layer is facilitated by heat (thermal) fusion at a temperature below the sublimation temperature of the dye. Various methods can be used to fuse dye into the polymeric dye image-receiving layer on the support to form the color filter array element. For example, there can be used radiant heaters, hot plates, ovens, etc.

The fusing temperature will be dependent upon the Tg of the dye image-receiving layer employed and the choice of plasticizer. In general, fusing can be accomplished, for example, by using a temperature of from about 35° C. to about 200° C. for a period of from about 0.1 minute up to about 30 minutes.

Another way to effect imagewise fusing of the dye into the dye image-receiving layer is by using heating such as a thermal resistive head as described in U.S. Pat. No. 4,621,271, the disclosure of which is hereby incorporated by reference.

Another kind of heating is the use of an array of metal prongs, or needles, having the dimensions and spacing of the desired pixel elements of the color filter array. Fusing the dye into the dye image-receiving layer may be accomplished by placing a heated array of needles into contact with the dye layer coated on the dye image-receiving layer for sufficient time to allow the heat to fuse the dye into the dye image-receiving layer.

Yet another way to effect the fusing of the dye into the dye image-receiving layer is by heating through irradiation of the pixel element with an intense beam of radiation absorbed by either or both the dye and the polymeric dye image-receiving layer. A convenient way of supplying the radiation is by flash discharge of an electrically charged capacitor through an argon-filled quartz tube. Such flash lamp tubes are widely employed as electronic photographic flash bulbs and, in larger sizes, as illuminating flash lamps for airport runways. The process of the invention provides a dye image-receiving layer which contains a thermally transferred image comprising a repeating pattern of colorants, preferably in a mosaic pattern.

In a preferred embodiment of the invention, the mosaic pattern consists of a set of red, green and blue additive primaries.

In another preferred embodiment of the invention, each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 μm and do not have to be of the same size.

In a preferred embodiment of the invention, the repeating mosaic pattern of dye to form the color filter array element consists of uniform, square, linear repeating areas, with one color diagonal displacement as follows:

```
RGBRG
BRGBR
GBRGB
```

In another preferred embodiment, the above squares are approximately 100 μm.

The color filter array elements prepared according to the invention can be used in image sensors or in various electro-optical devices such as electroscopic light valves or liquid crystal display devices. Such liquid crystal display devices are described, for example, in UK Patents 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The polymeric alignment layer described above can be any of the materials commonly used in the liquid crystal art. Examples of such materials include polyimides, polyvinyl alcohol and methyl cellulose.

The transparent conducting layer described above is also conventional in the liquid crystal art. Examples of such materials include indium tin oxide, indium oxide, tin oxide and cadmium stannate.

The dye image-receiving layer used in forming the color filter array element of the invention may comprise, for example, those polymers described in U.S. Pat. Nos. 4,695,286, 4,740,797 and 4,775,657, and 4,962,081, the disclosures of which are hereby incorporated by reference. In a preferred embodiment, polycarbonates or polyesters having a glass transition temperature greater than about 200° C. are employed. In another preferred embodiment, polycarbonates derived from a methylene-substituted bisphenol A such as 4,4-(hexahydro-4,7-methanoindan-5-ylidene)-bisphenol are employed. In general, good results have been obtained at a coverage of from about 0.25 to about 5 mg/m².

The support used in the invention is glass such as borax glass, borosilicate glass, chromium glass, crown glass, flint glass, lime glass, potash glass, silica-flint glass, soda glass, and zinc-crown glass. In a preferred embodiment, borosilicate glass is employed.

Various dyes or mixture of dyes can be used in the process of the invention. Especially good results have been obtained with the following dyes:

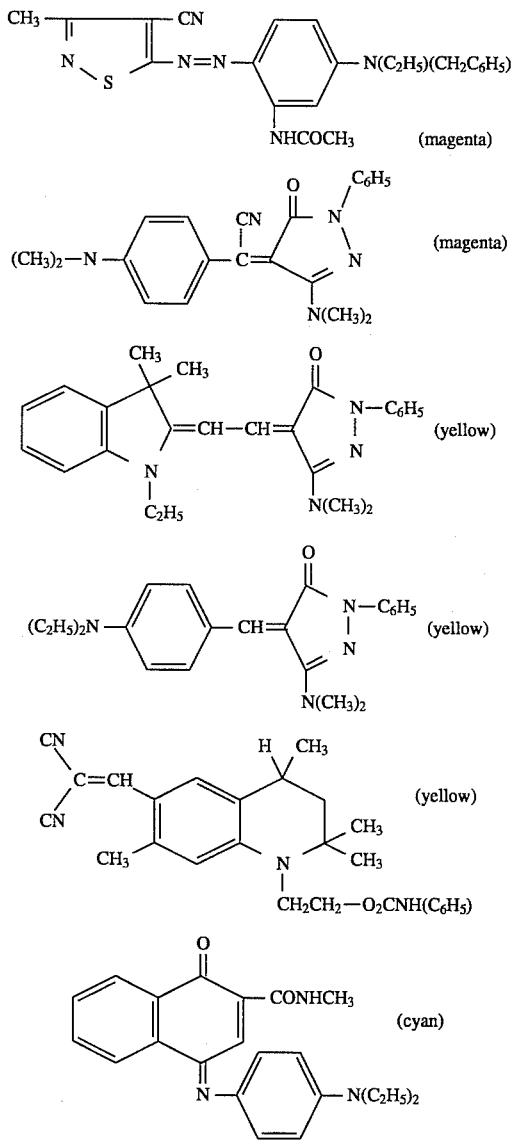

-continued

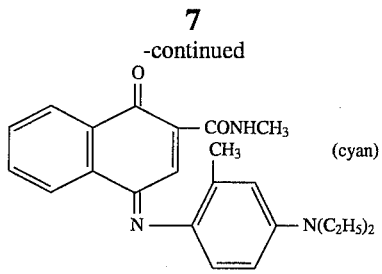
(cyan)

or any of the dyes disclosed in U.S. Pat. No. 4,541,830, the disclosure of which is hereby incorporated by reference. The above dyes may be employed singly or in combination to obtain a monochrome.

The above subtractive dyes can be employed in various combinations to obtain the desired red, blue and green additive primary colors, as disclosed in U.S. Pat. Nos. 4,957,898, 4,975,410, and 4,988,665, the disclosures of which are hereby incorporated by reference. The dyes can be mixed within the dye layer or transferred sequentially if coated in separate dye layers and can be used at a coverage of from about 0.05 to about 1 g/m².

The following examples are provided to illustrate the invention:

EXAMPLE 1

The following materials were employed:

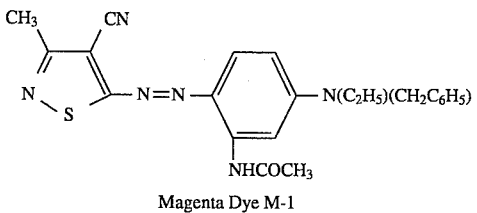
Magenta Dye M-1

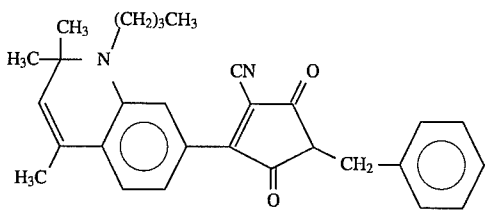
Magenta Dye M-2

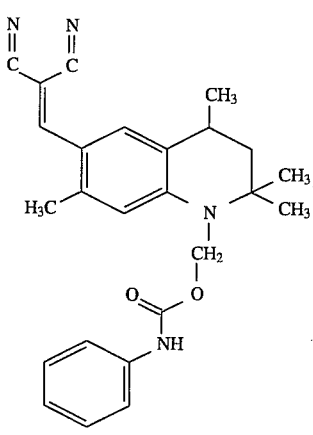
Yellow Dye

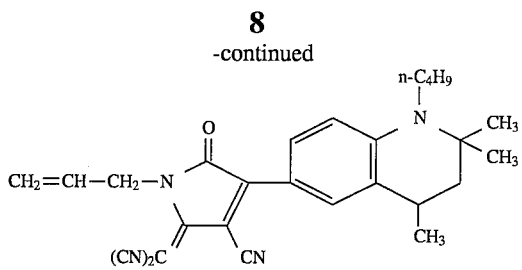
Cyan Dye

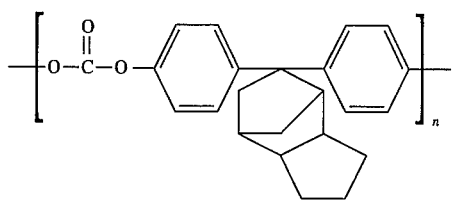
Receiver Polymer 1 (Tg = 260° C.)

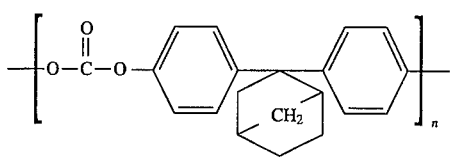
Receiver Polymer 2 (Tg = 220° C.)

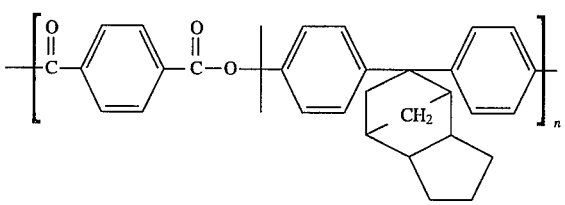
Receiver Polymer 3 (Tg = 300° C.)

Dye-receiving elements were prepared by coating onto a 0.08 cm (0.03 in.) glass support an anisole solution of 14.3 wt-% of Receiver Polymer 1 and 4.8 wt-% of test plasticizer resulting, after 15 min. of drying at room temperature, in a 3 μm thick coating with a laydown of 25 wt-% plasticizer.

A dye-donor element was prepared by coating onto 35 μm poly(ethylene terephthalate) (PET) a layer comprising 0.26 g/m² M-1, 0.28 g/m² Yellow Dye, 0.11 g/m² carbon black, 0.38 g/m² Butvat 76° (a poly(vinyl butyral) available from Monsanto Co.), and 0.01 g/m² Fluorad FC-431° (a perfluorinated surfactant available from 3M Corp.).

Test samples of the above elements (plasticizer in the receiver are shown in Table 1 below), with the donor between a Cr-on-quartz mask and receiver, were exposed in each case to the flash from an 800-volt flash lamp (EG&G, Salem, MA, Model FXQ-254-6 lamp) above the mask to pattern-wise transfer the dye from the donor into the receiver. U.S. Pat. No. 5,229,232 contains a detailed description of the procedure. The exposed receiver was then placed into an oven and subjected to heat fusion at 150° C. for 5 min. After the fusing step, spectra were run with a Perkin-Elmer Lambda 6 UV/VIS Spectrometer to measure the Dmax. The test receiver was then washed with methanol to remove unfused dye from its surface and the Dmax was measured again. The following results were obtained:

TABLE 1

| Plasticizer in Receiver Polymer | Dmax after fusing | after washing | % change |
|---|---|---|---|
| control (no plasticizer) | 2.48 | 0.09 | −96 |
| ethyl benzoate | 2.00 | 0.07 | −97 |
| catechol | 2.81 | 1.63 | −42 |
| butyl benzoate | 1.86 | 1.25 | −33 |
| dimethyl phthalate | 2.29 | 1.63 | −29 |
| resorcinol | 2.39 | 2.23 | −7 |
| sucrose diacetate hexaisobutyrate | 2.64 | 2.41 | −9 |
| diethyl phthalate | 2.26 | 2.21 | −2 |
| dibutyl phthalate | 2.78 | 2.74 | −1 |
| dioctyl phthalate | 1.29 | 1.28 | −1 |
| hexylresorcinol | 2.60 | 2.59 | 0 |

The data of Table 1 show that, under the experimental conditions studied in this Example, some plasticizers are useful in an amount as low as 25 wt. %.

EXAMPLE 2

Tests were run following the procedure described in Example 1 with the same dye-donor and dye-receiver elements using selected plasticzers at different levels. The following results were obtained

TABLE 2

| Plasticizer in Receiver Polymer | Plasticizer Level (wt %) | Dmax after fusing | after washing | % change |
|---|---|---|---|---|
| dimethyl phthalate | 25 | 2.29 | 1.63 | −29 |
| dimethyl phthalate | 35 | 1.98 | 1.99 | 1 |
| dibutyl phthalate | 20 | 2.35 | 2.34 | 0 |
| dibutyl phthalate | 25 | 2.78 | 2.74 | −1 |
| dioctyl phthalate | 15 | 2.18 | 2.21 | 1 |
| dioctyl phthalate | 25 | 1.29 | 1.28 | −1 |
| ethyl benzoate | 25 | 2 | 0.07 | −97 |
| ethyl benzoate | 36 | 1.82 | 1.31 | −28 |

The data of Table 2 show that increasing the level of certain plasticizers present in the receiver polymer significantly reduces density loss. One plasticizer is effective at only 15 wt. %.

EXAMPLE 3

A series of tests were run as described in Example 1 except that different receiver polymers were tested as indicated in Table 3 as follows:

TABLE 3

| Receiver Polymer | Dmax after fusing | after washing | % change |
|---|---|---|---|
| Receiver Polymer 1 no plasticizer | 2.48 | 0.09 | −96 |
| Receiver Polymer 1 with 25 wt % diethyl phthalate | 2.26 | 2.21 | −2 |
| Receiver Polymer 2 no plasticizer | 2.42 | 2.22 | −8 |
| Receiver Polymer 2 with 25 wt % diethyl phthalate | 2.22 | 2.19 | −1 |
| Receiver Polymer 3 no plasticizer | 1.95 | 1.49 | −24 |

TABLE 3-continued

| Receiver Polymer | Dmax after fusing | after washing | % change |
|---|---|---|---|
| Receiver Polymer 3 with 25 wt % diethyl phthalate | 2.06 | 1.95 | −5 |

The data of Table 3 again show that addition of the plasticizers useful in this invention will significantly reduce dye density loss.

EXAMPLE 4

To compare heat fusion of different dyes, several additional donor samples were coated on the 35 μm PET support with dry laydowns as follows:
red donor
  M-10.26 g/m$^2$
  Yellow Dye 0.28 g/m$^2$
  carbon black 0.11 g/m$^2$
  Butvar 765®0.38 g/m$^2$
  Fluorad FC-431®0.01 g/m$^2$
green donor
  Cyan Dye 0.27 g/m$^2$
  Yellow Dye 0.36 g/m$^2$
  carbon black 0.14 g/m$^2$
  Butvar 765®0.39 g/m$^2$
  Fluorad FC-431®0.01 g/m$^2$
blue donor
  Cyan Dye 0.25 g/m$^2$
  M-2 0.28 g/m$^2$
  carbon black 0.14 g/m$^2$
  Butvar 76®0.40 g/m$^2$
  Fluorad FC-431®0.01 g/m$^2$ The above dye-donors were each subjected to the testing procedures of Example 1, with the receiver of Example 1 containing no plasticizer or containing diethyl phthalate (25 wt-%). The following results were obtained:

TABLE 4

| Plasticizer in Receiver | Dye Donor | Dmax* after fusing | after washing | % change |
|---|---|---|---|---|
| no plasticizer | red | 2.48 | 0.09 | −96 |
| diethyl phthalate 25 wt % | red | 2.26 | 2.21 | −2 |
| no plasticizer | green | 2.04 (1.18) | 0.07 (0.07) | −97 (−94) |
| 25 wt % diethyl phthalate | green | 2.02 (1.21) | 1.82 (1.11) | −10 (−8) |
| no plasticizer | blue | 2.35 | 0.11 | −95 |
| 25 wt % diethyl phthalate | blue | 2.51 | 2.15 | −14 |

*the yellow density was measured for the red donor; the yellow and cyan densities were measured for the green donor, the values of the latter shown in parentheses; the blue density was measured for the blue donor.

The above data show that significant improvements in Dmax loss are obtained when the receiver layer contains a plasticizer of the invention.

EXAMPLE 5

This experiment was designed to check the Tg of the final coating after a second heating step to remove residual solvent. The densities of the dyes were also measured before and after the second heating step.

The receiver of Example 1 was used with two plasticizer levels (25 wt-and 35 wt-%) and four different plasticizers as detailed in Table 5. The dye-donor of Example 1 was used to provide the transferred dye. Test procedures were the same as indicated in Example 1 except that after the heat fusion step, the samples were post-baked for 60 min. at 200° C., followed by either 5 min. at 230° C., 5 min. at 220° C., or no such post-baking. The final Tg of the post-baked receiver polymers was determined by DSC (differential scanning calorimetry). The following results were obtained:

TABLE 5

| wt % plasticizer in receiver* | °C. Tg | max post-bake °C. | Y density after fusing | Y density after post-bake | Y % density change | M density after fusing | M density after post-bake | M % density change |
|---|---|---|---|---|---|---|---|---|
| 35 DMP | 249 | 230 | 2.27 | 2.02 | −11 | 1.85 | 1.64 | −11 |
| 25 DBP | 209 | 230 | 2.04 | 1.97 | −3 | 1.71 | 1.64 | −4 |
| 35 DMP | 265 | 200 | 2.19 | 2.13 | −3 | 1.8 | 1.76 | −2 |
| 25 DEP | 215 | 200 | 2 | 1.92 | −4 | 1.46 | 1.5 | 3 |
| 25 DBP | 198 | 200 | 2.16 | 2.12 | −2 | 1.81 | 1.77 | −2 |
| 25 DOP | 183 | 200 | 2.19 | 2.08 | −5 | 1.78 | 1.71 | −4 |
| 25 DEP | 262 | 220 | 2.14 | 1.86 | −13 | 1.56 | 1.46 | −6 |
| 35 DEP | 228 | 220 | 1.96 | 1.86 | −5 | 1.63 | 1.55 | −5 |

*DMP = dimethyl phthalate
DBP = dibutyl phthalate
DEP = diethyl phthalate
DOP = dioctyl phthalate The data of Table 5 clearly show that dye is not being lost during the second heating step to remove residual plasticizer and that the Tg of the dye image-receiving layer is approaching the Tg of the polymer in that layer.

The invention has been described in detail with particular reference to preferred embodiments thereof, but it will be understood that variations and modifications can be effected within the spirit and scope of the invention.

We claim:

1. A method of preparing a color filter array element comprising the following steps:

a) imagewise-heating a dye-donor element comprising a support having thereon a dye layer comprising a dye dispersed in a binder, said dye layer being in superposed relationship with a dye image receiving layer of a dye-receiving element comprising a support having thereon a dye image-receiving layer, said dye image receiving layer comprising a polymer which has a glass transition temperature above the sublimation temperature of said dye but which contains an organic plasticizer in an amount so that the glass transition temperature of said dye image-receiving layer is below said sublimation temperature of said dye;

b) transferring portions of said dye layer to said dye-receiving layer to form a repeating dye pattern thereon to form a color filter array; and c) subjecting said dye-receiving element to a fusing heat treatment below said sublimation temperature of said dye but at a sufficient temperature and for a sufficient time so that said dye is not stratified on the surface.

2. The process of claim 1 wherein said plasticizer is present in an amount of from about 5 to about 50 wt. % of said dye image-receiving layer.

3. The process of claim 1 further comprising coating a transparent conducting layer over said color filter array element and a polymeric alignment layer over said conducting layer.

4. The process of claim 1 wherein said polymeric dye image-receiving layer comprises a polycarbonate having a glass transition temperature greater than about 200° C.

5. The process of claim 4 wherein said polycarbonate is derived from 4,4'-(hexahydro-4,7-methanoindan-5-ylidene)bisphenol.

6. The process of claim 1 wherein said polymeric dye image-receiving layer comprises a polyester having a glass transition temperature greater than about 200° C.

7. The process of claim 1 wherein a mosaic pattern of a set of red, green and blue primary colors is obtained.

8. The process of claim 1 wherein said fusing heat treatment takes place at a temperature of from about 35° C. to about 200° C. about 200° C. for a period of from about 0.1 minute up to about 30 minutes.

* * * * *

UNITED STATES PATENT AND TRADEMARK OFFICE
CERTIFICATE OF CORRECTION

PATENT NO.: 5,599,766
DATED: February 4, 1997
INVENTOR(S): Michael L. Boroson and Cathy A. Fleischer It is certified that error appears in the above-identified patent and that said Letters Patent is hereby corrected as shown below On the title page, after item [22], insert
--Related U.S. Application Data
[63] Provisional Application Serial No. 60/007,167, filed November 1, 1995 --

In Column 1, line 3, insert
--CROSS REFERENCE TO RELATED APPLICATION
    Reference is made to and priority claimed from U.S. Provisional Application Serial No. US 60/007,167, filed 01 November 1995, entitled METHOD OF MAKING A COLOR FILTER ARRAY ELEMENT--

Signed and Sealed this

Third Day of February, 1998

BRUCE LEHMAN

*Attest:*

*Attesting Officer*    *Commissioner of Patents and Trademarks*